Feb. 6, 1962 F. A. LOSEE 3,020,483

SIGNAL RECOGNITION CIRCUIT USING PULSE POSITION MODULATION AND PULSE WIDTH DISCRIMINATION

Filed March 3, 1958 2 Sheets-Sheet 1

INVENTOR.
FERRIL A. LOSEE,
BY R. A. Bogucki
ATTORNEY.

Feb. 6, 1962 F. A. LOSEE 3,020,483

SIGNAL RECOGNITION CIRCUIT USING PULSE POSITION MODULATION AND PULSE WIDTH DISCRIMINATION

Filed March 3, 1958 2 Sheets-Sheet 2

INVENTOR.
FERRIL A. LOSEE,
BY
R. A. Boguski
ATTORNEY.

United States Patent Office 3,020,483
Patented Feb. 6, 1962

3,020,483

SIGNAL RECOGNITION CIRCUIT USING PULSE POSITION MODULATION AND PULSE WIDTH DISCRIMINATION

Ferril A. Losee, Los Angeles, Calif., assignor to Hughes Aircraft Company, Culver City, Calif., a corporation of Delaware Filed Mar. 3, 1958, Ser. No. 718,913
13 Claims. (Cl. 328—110)

Figure 1:
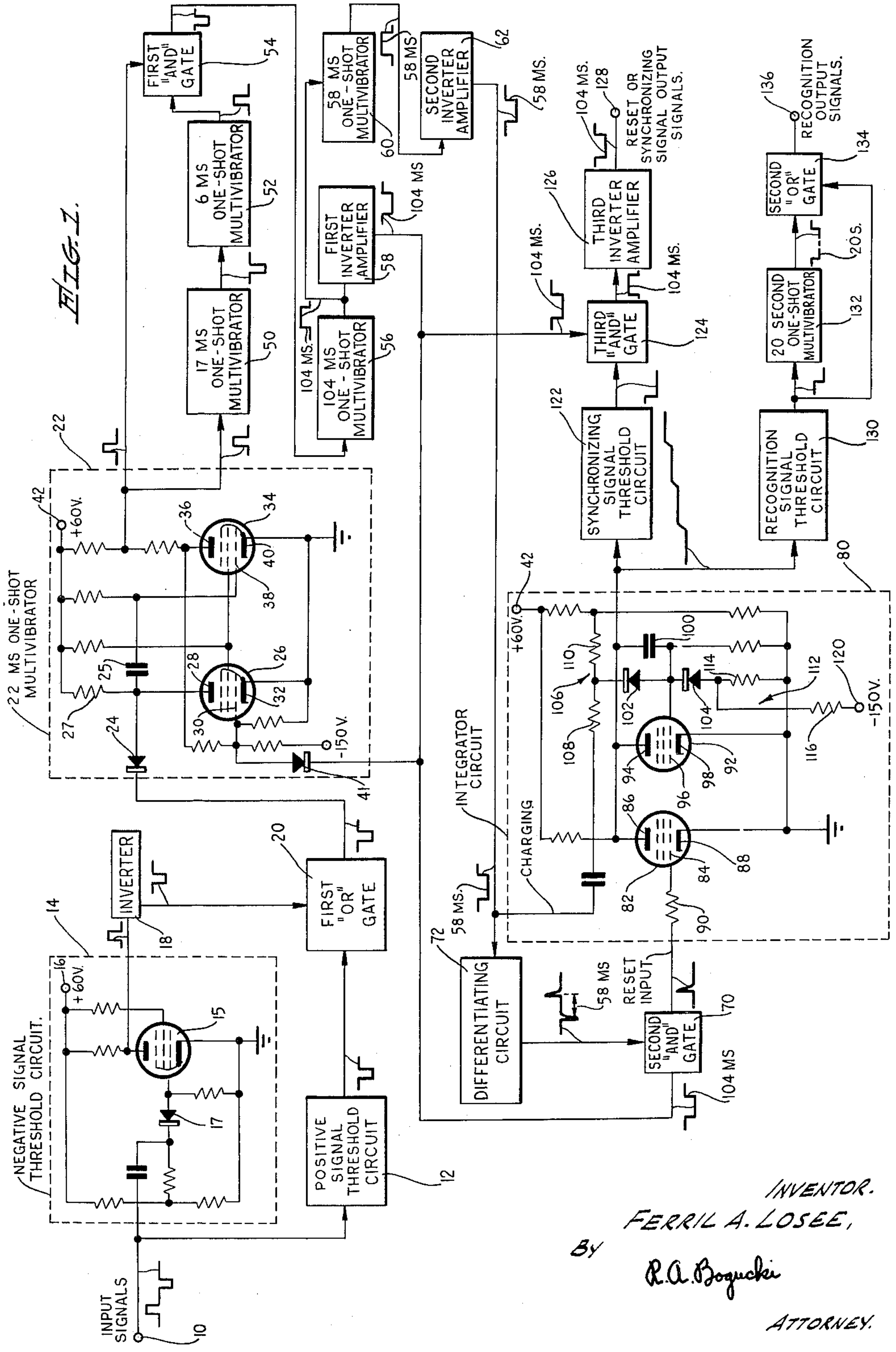

This invention relates to circuits for recognizing signal patterns, and particularly to circuits which detect and reliably indicate the presence of timing pulses occurring in a sequence of signals.

Pulse communication systems usually operate to control some output function or device, such as a printer. There is a need in such systems for circuits to control the output function in a manner which takes into account the reliability of the information received and which thus increases the accuracy of the information which is printed. Systems are known which detect synchronizing signals, for example, and which operate only under certain conditions of reliability. These systems have usually required separate synchronizing signals and have been limited to the rather simple function of detection of synchronization. Where the systems of the prior art have been capable of discriminating against noise corresponding to the synchronization pattern, they have usually been complex or required extensive signal handling equipment. Moreover, the systems of the prior art have usually required separate synchronizing signals inserted into the message being transmitted.

It is desirable in communication systems to increase the message content of transmitted signals by combining the synchronizing pulses with the symbols which are transmitted. Thus in the well known mark and space symbol representation of radio telegraphy, it is desirable to superimpose a pulse position modulation on the signals which also represent marks and spaces. The spacing between the first two symbols of a character, for example, may be greater than the spaces between remaining adjacent symbols. The problems in detecting the thus specially spaced pulses, which are hereafter referred to as synchronizing pulse pairs or simply synchronizing pairs, are greatly complicated by the combination of these signals in the message. It is also desirable, however, to additionally be able to know that signals which are detected as synchronizing pairs have a proper time relationship to each other and that the message being received may reliably be used. It is further desirable to be able to avoid erroneous message recordation, as to withhold printing, until a certain minimum number of synchronizing pairs have been detected. If the system can, in addition to these things, also operate reliably for a certain period when synchronization is momentarily lost then the signal recognition circuit should be able to maintain operation for that certain period on the chance that synchronization recognition will again be established.

Systems heretofore known have not satisfactorily provided this combination of desirable features. Such systems have, insofar as they have applied to one or more of the features, been extensive, complicated or have adversely affected the message content of the transmission.

It is therefore an object of this invention to provide an improved circuit for detecting synchronizing signals in a communication system.

It is another object of this invention to provide a highly reliable synchronization system for information transmitted in a pulse code having a pulse position modulation used to denote synchronizing pulse pairs.

A further object of this invention is to provide an improved system for deriving reliable control signals to govern the output function of a communication system.

Yet another object of this invention is to provide an improved circuit for operation with communications systems, which circuit indicates that reliable conditions of operation have been established, which provides signal synchronization and which maintains operation under specified conditions of signal reliability.

These and other objects of this invention may be achieved by a circuit employing an integrated arrangement for pulse spacing recognition, relative character spacing recognition and signal duration control. Signals of either polarity derived from recognition or other circuitry may be used to trigger a delay and gating arrangement so arranged as to provide an output on the occurrence of synchronizing pairs having a preselected spacing. A signal generated by this delay and gating arrangement indicates detection of properly spaced synchronizing pairs and is in turn employed to control circuitry which determines that the correct time relationships exist between successive synchronizing pairs. These signals are then employed to control further gating and signal adding circuitry which determines that an uninterrupted minimum sequence of properly spaced synchronizing pairs has occurred. When this determination is made the circuit provides, as output, both synchronizing or timing pulses and an additional "recognition" signal which is maintained for a specified period following interruption of a satisfactory synchronization operation.

Figure 2:
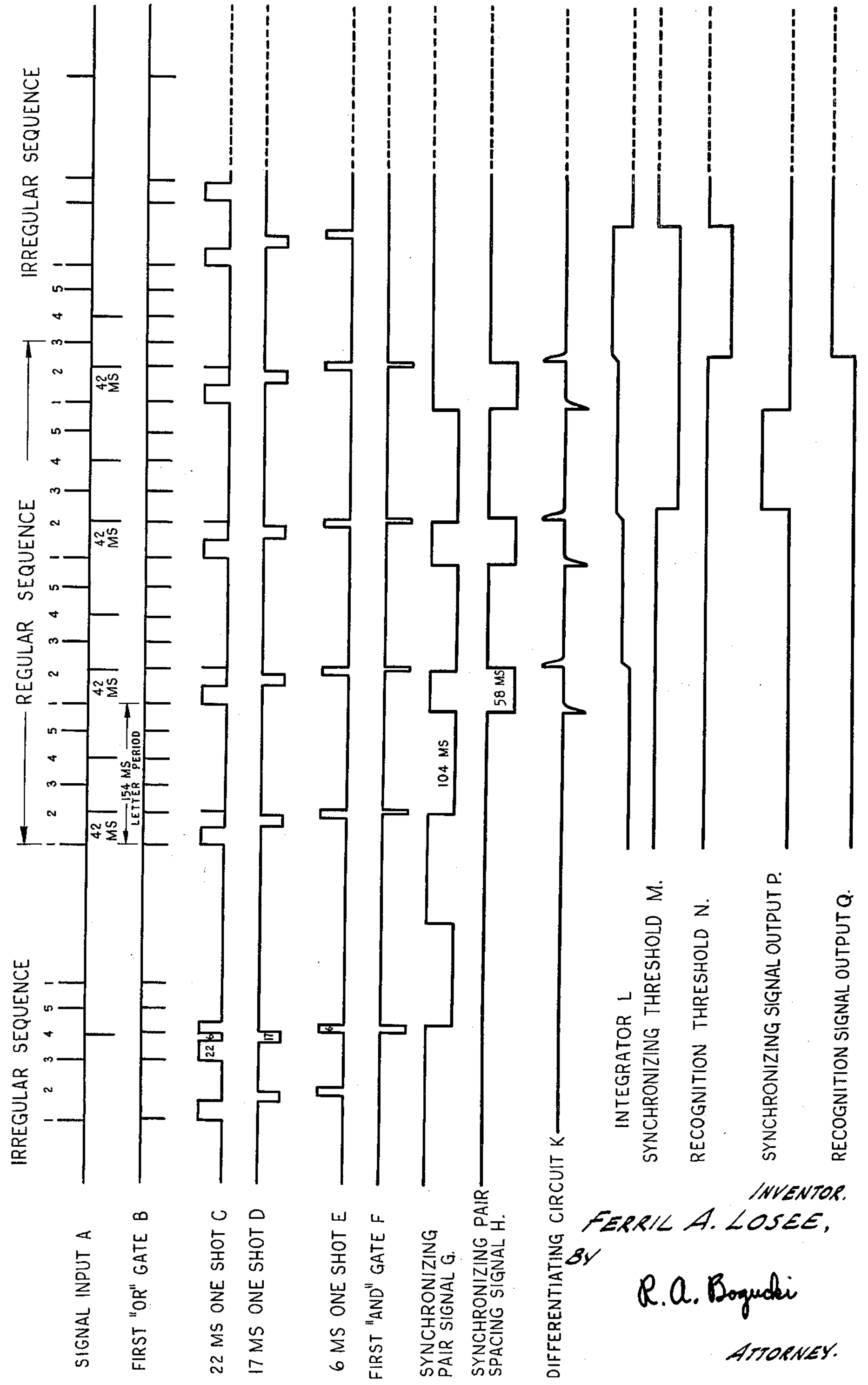

The novel features of this invention, as well as the invention itself will best be understood from the following description, taken in conjunction with the accompanying drawings, in which like reference numerals refer to like parts, and in which:

FIG. 1 is a circuit diagram, partially in block diagram form, of a circuit in accordance with the invention; and FIG. 2 is a time versus amplitude waveform diagram of the waveforms occurring at a number of points throughout the circuit of FIG. 1 in response to an assumed set of signal configurations. FIG. 2 includes a number of waveforms, designated A through Q.

A recognition circuit in accordance with the invention, referring now to FIG. 1, may receive input signals on an input terminal 10. These signals, comprising pulse trains of positive and negative pulses, may denote mark and space symbols group in letter (or character) periods in a manner described in more detail in conjunction with FIG. 2 below. The input signals are applied to a positive signal threshold circuit 12 and a negative signal threshold circuit 14. The threshold circuits each provide an output when the applied input signal is greater than a selected amplitude.

Some details of the negative signal threshold circuit 14 have been shown in order to illustrate one of the several techniques by which this result may be achieved. In the negative signal threshold circuit 14, a normally conducting pentode 15 is biased from a +60 volt supply 16 through a voltage divider chain and a clamping diode 17. Positive signals applied to this circuit have no effect because the polarity of the diode 17 is so arranged as to block such positive signals. Negative signals, however, are applied through the clamping diode 17 to the control grid of the conducting pentode 15 to limit conduction therein. Consequently the potential of the anode of the pentode 15 provides in response a positive pulse output from the negative signal threshold circuit 14. The positive signal threshold circuit 12 operates in like fashion but in response to pulses of positive polarity to provide outputs of negative polarity.

Outputs from the negative signal threshold circuit 14 are applied to an inverter 18, and through the inverter 18 to a first "or" gate 20. Outputs from the positive signal threshold circuit are applied to the remaining input of the first "or" gate 20. "Or" gates, such as the first "or" gate 20, are well known in the art of handling digital signals. These circuits are also known as mixing circuits, and provide an output when input signals are provided on any one of their terminals. The first "or" gate 20 here provides a negative output signal in response to negative input signals on either one of its two input terminals.

The negative outputs of the first "or" gate 20 are applied to the signal input of a one-shot multivibrator, here termed the 22 millisecond (ms.) one-shot multivibrator 22. One-shot, or monostable, multivibrators are also well known in the arts which employ digital signals. These devices provide a single output pulse of controllable duration in response to input pulses. A number of such devices are described in the book "Waveforms," by Chance et al., at page 166 et seq. This book is published by the McGraw-Hill Book Company Inc. (1949) and is also known as volume 19 of the Radiation Laboratory Series. The 22 ms. one-shot multivibrator 22 is shown in some detail in order to exemplify one arrangement which might be used. As is described generally in the just identified publication, the 22 ms. one-shot multivibrator 22 includes a first electron tube 26 and a second electron tube 34. Trigger signals are applied to the plate 28 of the first electron tube 26 and to the control grid 38 of the second electron tube 34 through a first diode 24 coupled to the first "or" gate 20, and through a timing circuit consisting of a timing condenser 25 and a timing resistor 27. The polarity of the first diode 24 is such as to pass only negative pulses to the associated electron tubes 26 and 34. In accordance with conventional monostable multivibrator arrangements, there is a cross-coupling between the plate 36 of the second electron tube 34 and the control grid 30 of the first electron tube 26. The cathode 32 of the first electron tube 26 and the cathode 40 of the second electron tube 34 are coupled together and to ground. The plates 28 and 36 of the electron tubes 26 and 34 respectively are coupled to a source of positive potential, which may be a +60 volt supply 42.

The operation of the 22 ms. one-shot multivibrator 22 is initiated by the application of the negative-going edge of a negative trigger pulse to the plate 28 of the first electron tube 26 and the control grid 38 of the second electron tube 34 through the first diode 24. The timing condenser 25 in the circuit operates to cut off the normally conducting second electron tube 34 for a period of time determined by the time constant of the timing circuit. Therefore, a positive pulse is derived at the plate 36 of the second electron tube 34 for the period determined by the values selected for the timing condenser 25 and the associated timing resistor 27. It will be understood that various means can be used to trigger this combination with the trailing or the leading edge of an input pulse of either polarity. Similarly, it will be understood that outputs of either polarity may be derived depending upon the tube from which the output signal is taken. The multivibrators described below are usually, except where otherwise specified, triggered by the trailing edge of an input pulse and provide an output pulse of specified duration and of opposite polarity to the input pulse.

A suppression or inhibiting feature is also employed in the 22 ms. one-shot multivibrator 22. A second diode 41, connected to pass signals of negative polarity, is coupled to the control grid 30 of the first electron tube 26. During the presence of a negative signal applied through the second diode 41, negative signals applied through the first diode 24 have no effect in triggering the 22 ms. multivibrator 22 because of the negative signal on the grid 30 of the first tube 26.

Outputs from the 22 ms. one-shot multivibrator 22 are applied to a 17 ms. one-shot multivibrator 50. The 17 ms. one-shot multivibrator 50 is triggered by the trailing edge of the positive pulse applied thereto and provides a negative pulse of 17 ms. duration to a coupled 6 ms. one-shot multivibrator 52. A positive pulse in turn is provided by the 6 ms. one-shot multivibrator 52. Thus it may be seen that pulses of different durations, progressively delayed, are transferred or provided along the series of multivibrators 22, 50, 52 and that these devices constitute a delay means. Outputs from the 6 ms. one-shot multivibrator 52 and from the 22 ms. one-shot multivibrator 22 are applied to the two inputs of a first "and" gate 54. "And," or coincidence gates, are well known in the arts which employ digital signal techniques. These gates have two or more inputs and provide an output only when signals of desired polarity are present on all of the inputs. The first "and" gate 54 has two inputs receiving signals of positive polarity and provides an output of negative polarity. Such an arrangement may be mechanized by diode gating circuits with inversion, if necessary, or by a multigrid tube which inherently inverts the applied signals in providing an output.

The output of the first "and" gate 54 is provided to a 104 ms. one-shot multivibrator 56 which is triggered by the trailing edge of the applied negative signal to provide a pulse of 104 ms. duration to a coupled first inverter amplifier 58. The output of the first inverter amplifier 58 is hereinafter termed the "synchronizing pair" signal, this synchronizing pair signal being fed back to the suppression input applied through the second diode 41 to the 22 ms. one-shot multivibrator 22. Outputs from the 104 ms. one-shot multivibrator 56 are also applied to a 58 ms. one-shot multivibrator 60. In response to the trailing edge of the positive pulse applied thereto, the 58 ms. one-shot multivibrator 60 provides a negative pulse of 58 milliseconds duration to a second inverter amplifier 62. The output of the second inverter amplifier 62 is hereafter termed the "synchronizing pair spacing signal."

The synchronizing pair signal from the first inverter amplifier 58 is also applied to one input of a second, two input, "and" gate 70. The synchronizing pair spacing signal from the second inverter amplifier 62 is applied to the remaining input of the second "and" gate 70 through a differentiating circuit 72. The differentiating circuit 72 provides, in conventional fashion, a negative spike in response to a negative-going edge and a positive spike in response to a positive-going edge. With the coincidence of positive signals on its two inputs, the scond "and" gate 70 provides a positive output to the reset input of a coupled integrator circuit 80. The second "and" gate 70 thus may be seen to be of the type which provides a noninverted output pulse.

The integrator circuit 80 has two inputs, one of which is hereafter termed a "charging signal" input, or simply a signal input, and the other of which is termed a reset input. The integrator circuit 80 is intended to provide pedestal signals of increasing height up to a given maximum when successive charging signals are applied but to discharge entirely to a start or zero condition when a reset input is applied. To this end, the integrator circuit 80 includes a trigger tube 82 having its control grid 84 coupled through a current limiting resistor 90 to the reset input. The plate 86 of the trigger tube is coupled to the +60 volt supply 42 and the cathode 88 is coupled to ground. A second electron tube, hereafter called an integrator tube 92, has its plate 94 coupled directly to the plate 86 of the trigger tube and its cathode 98 also coupled to ground. The control grid 96 of the integrator tube is coupled to one terminal of a storage condenser 100. A first biasing diode 102 and a second biasing diode 104 are coupled to the control grid 96 of the integrator tube. The first biasing diode 102 is coupled to the midpoint of a first voltage divider 106, consisting of a pair of resistors 108 and 110.

The first voltage divider 106 is coupled at one terminal to the charging signal input and at the other terminal to the +60 voltage supply 42. The second biasing diode 104 is coupled to the midpoint of a second voltage divider 112 consisting of a pair of resistors 114 and 116 which are coupled between the −150 volt supply 120 and ground. The polarities of the first and second biasing diodes, 102 and 104, are selected such that in the quiescent condition the integrator tube 92 is operated within predetermined potential limits.

The output of the integrator circuit 80 is taken from a terminal, or "output side," of the storage condenser 100 which is coupled at that same terminal to the plate 94 of the integrator tube 92 and also to the plate 86 of the trigger tube 82. The opposite terminal of the storage condenser 100 is coupled to the midpoint between the first and second biasing diodes, 102 and 104 respectively. As negative signals are applied on the charging signal input to the integrator circuit 80, these signals are directed through the first voltage divider 106 and the first biasing diode 102 to the control grid 96 of the integrator tube 92. In response to these negative signals, the potential of the plate 94 of the integrator tube 92 rises correspondingly to apply a positive signal to the output side of the storage condenser 100. The storage condenser 100 discharges slowly, because of the high impedance discharge path to which it is coupled. The voltage on the output terminal of the storage condenser 100 is thus maintained substantially constant, between charging signal inputs, at the level which the storage condenser 100 has reached. When a second, successive, charging signal input is applied to the control grid 96 of the integrator tube 92 it, like the first input, applies a positive signal to the output terminal of the storage condenser 100. Thus the output potential of the integrator circuit 80 ascends in staircase fashion as successive charging signal inputs are applied, to cumulatively indicate the occurrence of charging signal inputs. The ultimate amplitude of this staircase signal may be varied, depending upon voltages used and the values of the first and second voltage dividers 106 and 112 respectively. In the present example, however, it is assumed that the values are such that only four steps of relatively equal amplitude are provided before a maximum output level is reached.

On the application of a positive reset signal on the reset input of the integrator circuit 80, the storage condenser 100 is completely discharged and the output provided from the integrator circuit 80 returned to the zero or quiescent level. The positive signal applied to the control grid 84 of the trigger tube 82 causes the potential of the plate 86 to decrease sharply. Because the plates, 86 and 94 respectively, of the trigger tube 82 and the integrator tube 92 are tied together and to the output terminal of the storage condenser 100, the potential of these elements is returned to the quiescent level as the storage condenser 100 is discharged. This may be viewed as a "dumping" action for the storage condenser 100.

From the output of the integrator circuit 80, the signals provided are diverted through two channels, one of which provides "reset" or synchronizing output signals (to reset or synchronize other circuitry) and the other of which provides "recognition" signals, which may be used for printing control. In the reset channel, the output of the integrator circuit 80 is coupled to the input of a synchronizing signal threshold circuit 122. The synchronizing signal threshold circuit 122 is arranged to have two conditions of operation, there being a first, relatively high, potential output provided when the input signals derived from the integrator circuit 80 are below a predetermined level. This predetermined level is taken as two of the steps in the staircase signal provided by the integrator circuit 80. When the staircase signal reaches the second step above the quiescent level, therefore, the synchronizing signal threshold circuit 122 operates to provide the second output potential, which is lower than the first output potential level. Outputs from the synchronizing signal threshold circuit 122 are provided to a third "and" gate 124 having a second input responsive to synchronizing pair signals from the first inverter amplifier 58. Outputs from the third "and" gate 124 are provided through a third inverter amplifier 126 to a synchronizing signal output terminal 128 which may be coupled to associated circuits to be controlled. A primary use for this signal may be to use it as a synchronizing signal for control and output circuitry, to place such circuits in positive locked time relationship to the messages being provided.

In the second channel of signals provided from the integrator circuit 80, the signals are provided to a recognition signal threshold circuit 130 which is arranged to operate at a first output level until the third step (above the quiescent level) of the staircase signal provided by the integrator circuit 80 has been reached. Thereafter, the recognition signal threshold circuit 130 provides a second output potential level which is lower than the first. This lower output potential constitutes a recognition signal in the present system. When the recognition signal terminates, that is when a positive-going edge is provided in the waveform from the recognition signal threshold circuit 130, an actuating input signal is provided to an associated 20 second one-shot multivibrator 132. The 20 second one-shot multivibrator 132 is thus triggered when recognition is lost and provides an output pulse for a period of 20 seconds thereafter. The 20 second duration is only exemplary of values employed on one practical application. It has been found that the associated controlled circuitry can operate reliably for this period even though no synchronizing signals are provided. The time selected may, of course, be considerably less. Note that in the present example the output from the 20 second one-shot multivibrator 132 is not inverted from the input pulse.

Outputs from the recognition signal threshold circuit 130 and the 20 second one-shot multivibrator 132 are applied individually to the inputs of a second, two input, "or" gate 134. The second "or" gate 134 here used is of the type which provides an inverted signal as output, although separate inversion amplification may be employed. Outputs from the second "or" gate 134 are applied to a recognition signal output terminal 136. In an operating communication system in which the present invention is employed, recognition output signals of positive polarity are used to control printing and other circuitry. As long as a positive signal is provided on the recognition signal output terminal 136, the message being received is printed out.

*Operation*

In operation, a system in accordance with this invention may be used to derive timing and control signals received in a pulse code communications system. In an environment in which this system may operate, a succession of input pulses of either polarity, grouped in letter periods to represent individual characters may be derived at a receiver (not shown) and applied as input signals to the present system. The input signals may, of course, not be the desired true square wave signals but may instead include noise or fading signals which might in the systems of the prior art cause the loss of control or the generation of erroneous timing signals. As is described in more detail in conjunction with FIGURE 2 below, each letter period in a properly transmitted signal sequence includes a first pair of synchronizing signals, termed a synchronizing pair, followed by three other information signals. The spacing or time separation between corresponding edges of the synchronizing pair pulses differ from the spacing between like succeeding pairs. The synchronizing pair may be said to be uniquely spaced and to occupy a selected position in each letter period. Consequently, each baud or letter period includes five pulses or symbols which include pulse position modulation as well as dual symbol amplitude operation.

It is desired to operate the associated controlled circuitry only under certain reliable conditions of operation. It is desired to discriminate against erroneous synchronizing pairs which would result, for example, from the application of successive noise signals having the same spacing as a synchronizing pair. It is also desired to establish timing by ascertaining that a number of successive signals have been received correctly, and to continue to supply timing signals as long as the synchronizing signals are correctly received. When synchronization is lost, however, it is not desired to discontinue the output function immediately but instead to maintain operation for as long as the system can be expected to operate inherently in synchronism and, if the synchronization is regained, to recommence the provision of synchronizing signals without the cesastion or interruption of the output function.

The timing signals which are provided by this system are variously referred to as synchronizing signals or reset signals. They may be used not only for the control of printing but otherwise within the receiver for the control of various synchronization functions. The signals which govern the operation of the controlled apparatus are designated herein as recognition output signals, to denote that recognition conditions have been established and that the output function, such as the printing function, may be continued.

*Operation with a succession of correct signals.* — In FIG. 2 are shown principally the group of waveforms which result when a regular signal sequence is provided to the system. The input to the system, shown as waveform 2(A), consists of signals of positive or negative polarity applied sequentially. There are shown the successive signal patterns for mark symbols, although the symbol used is not critical to the operation of the system. The timing relationship is the controlling factor.

It is assumed that the system is in a quiescent condition at the start of a regular signal sequence. Referring to both FIGS. 1 and 2, therefore, it may be seen that the signal input (A) is provided from the input terminal 10 through the negative signal threshold circuit 14 and the positive signal threshold circuit 12, and through the inverter 18 coupled to the negative signal threshold circuit 14, to the first "or" gate 20. The first "or" gate 20 therefore provides output signals of like polarity, in this instance negative polarity, to the coupled 22 ms. one-shot multivibrator 22. The train of signals thus provided comprises the successive letter periods in which the first two pulses are spaced by 42 milliseconds and the successive pairs of pulses are spaced by 28 milliseconds. The use of the two threshold circuits 12 and 14 assures that noise and transient signals below a predetermined level are not passed through to activate the remainder of the system. The inverter 18 provides that signals of like polarity are applied on both the inputs of the first "or" gate 20.

On receipt of these first signals of the regular signal sequence, the suppression input of the 22 ms. one-shot multivibrator does not have a suppression signal applied thereto. Such suppression signals are derived from the 104 ms. one-shot multivibrator 56 which at this point in time is in the unfired condition. Therefore, as described above, a negative signal applied through the first diode 24 fires the 22 ms. one-shot multivibrator 22 to provide a positive output of 22 milliseconds duration. The time relationship of this signal is shown in waveform 2(C). The trailing edge of the output of the 22ms. one-shot multivibrator 22 is used to fire the 17 ms. one-shot multivibrator 50, which in turn provides a negative output pulse of 17 milliseconds duration and having a positive going trailing edge which fires the coupled 6 ms. one-shot multivibrator 52 (see waveforms 2(D) and 2(E) respectively).

The positive output of the 6 ms. one-shot multivibrator 52 extends from a time 39 milliseconds after the initial input to a time 45 milliseconds thereafter, the delays in the successive one-shot multivibrators 22, 50 and 52 being additive. In effect, the output of the 6 ms. one-shot multivibrator 52 opens the first "and" gate 54 for 6 milliseconds during this period, which is the period during which the next successive pulse of a synchronizing pair should be provided. Note that separate one-shot multivibrators 22 and 50 are employed rather than a single one-shot multivibrator having the total equivalent duration, because each input pulse must be employed to initiate the search for the next pulse of a synchronizing pair of signals. Consequently, when the second pulse is applied through the 22 ms. one-shot multivibrator 22, 42 milliseconds after the start of a letter period, the output provided therefrom activates the remaining input of the first "and" gate 54, which in response provides a negative output to the 104 ms. one-shot multivibrator 56.

The 104 ms. one-shot multivibrator 56 provides, through the first inverter amplifier 58, the synchronizing pair signal for the remainder of the system. This signal is fed back to the suppression input of the 22 ms. one-shot multivibrator 22, terminating the output then provided from that device and insuring that for the next succeeding 104 milliseconds no timing signals can be provided through the coupled chain of one-shot multivibrators 22, 50 and 52. Any erroneous signals provided during this time by transitory effects are likewise blanked out during the 104 milliseconds. If the first multivibrator 22 of the chain should fire erroneously because of the brief spike applied thereto the succeeding pulses would have no effect. The result is that the third, fourth and fifth pulses of a baud have no effect although they are applied to the 22 ms. one-shot multivibrator 22, and this multivibrator 22 is not reopened for operation until the first pulse of the next baud (which is the first pulse of the next synchronizing pair) is applied. The relative time duration of the output of the 104 ms. one-shot multivibrator 56 and its relationship to the input pulse sequence and the intermediate pulses provided may be seen in waveform 2(G).

The output of the 104 ms. one-shot multivibrator 56 is used to trigger, at the close of the 104 millisecond period, the coupled 58 ms. one-shot multivibrator 60, the output of which, after passing through the second inverter amplifier 62, is the negative signal which is here termed the synchronizing pair spacing signal. If the next successive synchronizing pair is not properly detected within the 58 millisecond period of the 58 ms. one-shot multivibrator 60, the relationship between the successive synchronizing pairs is not correct and signals are not to be provided from the system. The relationship between the output of the 58 ms. one-shot multivibrator 60 and the synchronizing pair signals, and the manner in which the 58 millisecond signal encompasses the 42 millisecond period between the pulses of a synchronizing pair may be seen by comparing time relationship between waveform 2(H) and waveform 2(A).

As successive synchronizing pair spacing signals are provided, they are used at the charging signal input to the integrator circuit 80, to charge the storage condenser 100 in the integrator circuit 80 to successively higher steps. As described previously, and as may be seen in waveform 2(L), each charging signal input provides a successively higher output level from the integrator circuit 80. When a maximum output level is reached, the integrator circuit 80 remains at a consistently high level.

Synchronizing output signals are provided on the output 128 from the combination of the outputs of the synchronizing signal threshold circuit 122 and the synchronizing pair signals from the 104 ms. one-shot multivibrator 56. The synchronizing signal threshold circuit 128 does not provide a negative output until the second stage level of the integrator circuit 80 output is provided. As seen in waveform 2(L), the output of the integrator circuit 80 activates the synchronizing signal threshold circuit 122 at this time and in turn the coupled input of the third "and" gate 124 is activated. The coupled synchronizing pair signal from the first inverter amplifier 58, when applied to the remaining input of the third "and" gate 124, thus is passed through that gate 124 and the third inverter amplifier 126 to the synchronizing signal output at the terminal 128. As long as a regular and successive signal sequence is provided, therefore, this action may be summarized by saying that the synchronizing signal threshold circuit 122 is activated into a steady state condition and that synchronizing pair signals are provided through the third "and" gate 124 to the synchronizing output terminal 128.

As described above, the recognition signal threshold circuit 130 is not activated until three successive correct signals are indicated by the output of the integrator circuit 80. Again, as may be seen from waveform 2(N), a negative voltage is provided from the recognition signal threshold circuit 130. No gating arrangement is, however, employed. The outputs of the recognition signal threshold circuit are applied to the recognition signal output terminal 136 through the coupled, signal inverting, second "or" gate 134. Consequently, as long as a positive output signal is present on the recognition signal output terminal 136, this positive signal may be used as a control for output functions of the system. To account for a temporary loss of signals which is of such duration that it will not disturb the controlled operating system, this arrangement includes the coupled 20 second one-shot multivibrator 132. When a positive-going edge signal is derived from the recognition signal threshold circuit 130, the 20 second one-shot multivibrator 132 is triggered to provide a negative output pulse of 20 seconds duration. This time can be varied as desired but has been found suitable in the installation in which the present invention is employed. Negative signals from the 20 second one-shot multivibrator 132 also provide recognition signals on the recognition signal output terminal 136, no matter what input signals are applied or exist in the remainder of the system.

The determination of incorrect signal sequences is a complex matter determined by a number of the units employed. As may be seen by comparison of the trailing edge of the synchronizing pair spacing signal waveform 2(H), which is the output of the second inverter amplifier 62, with the leading edge of the synchronizing pair signal waveform 2(G), which is the output of the first inverter amplifier 58, there is a certain period during which these pulses overlap. Each synchronizing pair signal must occur in this relationship to the previous synchronizing pair spacing signal or the proper timing relationship will not have been observed. The use of these signals with the coupled differentiating circuit 72 and second "and" gate 70, together with the reset input of the integrator circuit 80, insures that a missed synchronizing pair signal inverts the integrator circuit 80 to its initial output level. The leading edge of the synchronizing pair spacing signal provides a negative spike from the differentiating circuit 72, whereas the positive-going trailing edge provides a positive spike. With properly related synchronizing pairs occurring, the negative synchronizing pair signal is applied to the coupled input of the second "and" gate 70 when this positive spike is provided from the differentiating circuit 72. Under correct signal operation, therefore, the second "and" gate 70 does not provide an output. If, however, the next synchronizing pair signal is not detected in the proper time interval, so that a synchronizing pair signal is not present at the second "and" gate 70, both inputs of the second "and" gate 70 are activated and a positive signal is provided on the reset input to the integrator circuit 80. As previously described, this positive signal causes the trigger tube 82 to conduct, discharging the storage condenser 100 and, in effect, "dumping" the integrator circuit 80.

The operation of the system in providing individual synchronizing or timing signals and in providing recognition or control signals may thus be said to include the functions of detecting the synchronizing relationship detecting correctly spaced synchronizing signals, counting the number of correctly detected and spaced synchronizing signals and using these to provide timing and control outputs as long as correct relationships exist. The signals thus provided discriminate against both long term fading and short term noise and provide a good indication of the reliability of the signals received by the system.

*Irregular signal sequences.*—The value of this system in providing discrimination against erroneous signal patterns may be better understood by comparing the above sequence of operations with the irregular signal sequences illustrated in FIG. 2. If at least two properly spaced synchronizing pairs are not successively detected, the effect will be to charge the integrator circuit 80 and to subsequently discharge the integrator circuit 80 at the time the next synchronizing pulse pair should have been detected. The irregular sequence shown as occurring prior to the regular sequence in FIG. 2 illustrates this fact, as well as the fact that a single pulse alone does not provide any charging signal to the integrator circuit 80.

As may be seen in FIG. 2, the irregular sequence provided includes only the first, third, fourth and fifth pulses of a letter period. A synchronizing pair therefore does not exist for this period. The first pulse triggers the first chain of one-shot multivibrators 22, 50 and 52, but the next pulse of the synchronizing pair is not available to fully activate the first "and" gate 54. Thus no output is provided to the associated 104 ms. one-shot multivibrator 56. A single pulse does not, therefore, pass the first "and" gate 54.

The subsequent pulses of this baud in the irregular sequence serve only to charge and then discharge the integrator circuit 80. The third pulse, for example, initiates the action of the first three multivibrators 22, 50 and 52. When the next pulse in this sequence, the fourth pulse, is applied it again triggers the 22 ms. one-shot multivibrator 22, which provides a positive output pulse to the first "and" gate 54 during the period that the 6 ms. one-shot multivibrator 52 is fired. Consequently an output is provided from the first "and" gate, as shown in FIG. 2(F), and the 104 ms. one-shot multivibrator 56 and the 58 ms. one-shot multivibrator 60 are in turn fired to provide the synchronizing pair signal and the synchronizing pair spacing signal. The synchronizing pair signal suppresses the operation of the 22 ms. one-shot multivibrator 22 for the 104 millisecond period. The synchronizing pair spacing signal also charges the integrator circuit 80 to the first level of output. Toward the end of the duration of the 58 millisecond pulse, however, another synchronizing pair should be detected in order that the 104 ms. one-shot multivibrator 56 can be fired at the proper time. No such signals are available, however, and as a consequence the positive pulse provided through the differentiating circuit 72 at the trailing edge of the 58 millisecond pulse is gated through the second "and" gate 70 because the remaining input of that gate 70 is activated due to the unfired condition of the 104 ms. one-shot multivibrator 56. As a result, a reset input is applied to the integrator circuit 80 to dump the integrator circuit 80 and reset it to the original condition.

Thus it may be seen that although the integrator circuit may be charged by signals which do not comprise a synchronizing pair, the system operates to discharge the integrator circuit 80 if another synchronizing pair is not in fact detected at the proper time.

The operation also illustrates to describe the manner in which a regular sequence of signals operates to terminate the outputs from the system when an irregular signal sequence results. Reference may be made to the irregular sequence provided following the regular sequence in FIG. 2. The 104 ms. one-shot multivibrator 56 keeps the 22 ms. one-shot multivibrator 22 suppressed, in this condition of operation, until just before the first pulse of a synchronizing pair is to be provided. When such a signal is provided, the action may be continued, dependent upon the relationship of the second signal of the synchronizing pair. When the first pulse of the synchronizing pair does not occur, however, the 104 ms. one-shot multivibrator 56 is not triggered in time to prevent the discharge of the integrator circuit 80. Only a three millisecond period is available for this pulse to occur, so that it is apparent that there is little likelihood that an erroneous timing relationship will cause the system to continue operation.

Once the integrator circuit 80 has been fully discharged, the operation of the system is reverted to the initial operating conditions previously described and the system reacts according to the regular or irregular signal patterns received.

Thus there has been described an improved arrangement for deriving, from time spaced series of pulses, timing and control signals which represent reliable conditions of operation. Predetermined time relationships between signals are detected and used together with signals which indicate the occurrence of appropriate successive signal combinations. The two signals thus derived are used with further circuitry to provide timing signals after a specified minimum period of satisfactory operation, and to provide control signals which are sustained despite a temporary loss of satisfactory operation.

I claim:

1. A recognition system for providing a control signal useful for exercising a control function and indicating conditions of reliable reception in a communication system, said recognition system comprising: means responsive to a message containing regularly spaced synchronizing signals for signalling the occurrence of synchronizing signals; means responsive to said means for signalling for indicating the proper time interval of the next succeeding synchronizing signal; means coupled to said means for signalling and said means for indicating for providing successively higher outputs, up to a given maximum, as long as an uninterrupted sequence of properly time related synchronizing signals is provided, said means being reset to a starting condition on the absence of a properly timed synchronizing signal; means responsive to said means for signalling and said means for providing successively higher outputs for providing timing signals following a selected sequence of properly time related signals; and means responsive to said means for providing successively higher outputs for providing a control signal following detection of a given minimum number of properly time related synchronizing signals and for a selected period of time following reset of said means to a starting condition.

2. A system for indicating, from a sequence of time spaced signals having regularly recurring synchronizing spacing of unique duration, the presence of signalling conditions suitable for reliable signal interpretation, comprising: means responsive to the input signal sequence for detecting signal spacings having the unique durations; means including time delay and coincidence means coupled to said detecting means for signalling the absence of signals having the synchronizing spacing in the regularly recurring time interval allotted for said signals; means, coupled to said means for detecting and said means for signalling, and resettable to a starting condition when signals having the synchronizing spacing do not occur in the time interval allotted therefor, for indicating the correct uninterrupted occurrence of a predetermined minimum number of synchronizing spacings; and means coupled to said last named means for maintaining an output control signal for a predetermined time after the detection of the last unique pulse spacing.

3. A circuit for detecting the occurrence of a synchronizing pair of signals having a different time relationship from the remainder of pulses in a pulse code communication system comprising: first delay means, including an inactivating suppression input, responsive to input pulses and providing a delayed output in response to initial pulses provided thereto; and means including second delay means for providing a suppression input signal to said first delay means at a predetermined interval following the application of an initial pulse, said suppression input operating to inactivate said first delay means until the next synchronizing pair is to be provided.

4. A circuit for providing an indication of the number of correctly spaced synchronizing signals occurring in a communication system which employs uniquely spaced synchronizing pairs occurring in like positions in each letter period, said system comprising: first delay means, including a first series of one shot multivibrators arranged to successively delay pulses applied thereto and a coincidence circuit coupled to two of said multivibrators and providing an output in response to the unique spacing between pulses, a first of said multivibrators including a suppression input; second delay means including a second series of one shot multivibrators, one of which is coupled to said suppression input and another of which provides an output indicative of the proper time of occurrence of the next subsequent synchronizing pair following an initial pulse; and means coupled to said second delay means for additively indicating, up to a given maximum, the number of successive and correctly related synchronizing pairs which are provided.

5. For a pulse code communication system utilizing letter groupings which include regularly spaced pulses and a pair of uniquely spaced synchronizing pulses in a selected position thereof, a system for providing control and timing signals indicative of reliable operation comprising: first means, including first delay and gating means, for providing a signal indicating the occurrence of the specified synchronizing pair spacing between a pair of signals; second means, including second delay means, responsive to said first means and providing a subsequent signal timed to occur during the period of the next regularly spaced synchronizing pair; means responsive to said first means and said second means for detecting the coincidence of signals therefrom; and a re-settable signal storage circuit responsive to said second means for providing a successively increased output as long as synchronizing pairs are sequentially detected in the correct relative intervals and responsive to said means for detecting coincidence for resetting to an initial starting condition in response to signals therefrom indicating lack of coincidence.

6. In a pulse code communication system which employs a plurality of pulses for each character, one synchronizing pair of which pulses is differently spaced from the remainder in the character, a system for providing signals indicative of the occurrence of reliable timing and control conditions comprising: first means, including a first group of series-connected one-shot multivibrators, one of said one-shot multivibrators including a suppression input, and a coupled coincidence gate, said first means providing an output from said coincidence gate when a delayed initial pulse transferred along said multivibrators coincides after a predetermined time corresponding to the spacing between the pulses of a synchronizing pair with the next pulse in the series; second means, including a second group of series-connected one-shot multivibrators for providing first and second outputs delayed in time, the first of said outputs being applied to the suppression input in the first group of multivibrators for suppressing operation therein during the time interval of the regularly spaced signals of the character, the second output being provided during the time interval of the next subsequent synchronizing pair is to be provided; third means responsive to said second output for providing a pulse on the termination of said second output signal; fourth means responsive to the second output signal termination pulse and to the first output signal from said second group of multivibrators for detecting the occurrence of the termination of the second output signal without the coincident presence of the next subsequent first output signal; and a signal integrating circuit responsive to said second output signal and coupled to said fourth means and being charged in successively higher steps up to a predetermined maximum in response to said second output signals and being returned to an initial starting condition in response to signals from said fourth means, said signal storage means providing an indication of the number of correctly detected and correctly relatively spaced synchronizing pairs occurring in succession.

7. The invention as described in claim 6 above wherein said third means for providing a pulse on the termination of the second output signal includes signal differentiating means; wherein said fourth means includes a coincidence gate; and wherein said signal integrating circuit includes a storage condenser having an associated electron tube circuit including charging signal and reset signal inputs for providing a discharge path for said condenser when a reset signal is provided.

8. The invention as set forth in claim 7 above wherein in addition there are coupled to said signal integrating circuit a recognition output circuit including a threshold circuit responsive to said integrator output and operative to provide a predetermined signal level when a given output potential from said integrator circuit is exceeded, a one-shot multivibrator coupled to the output of said threshold circuit and providing an output on the terminal of signals therefrom having said predetermined potential level; a mixer gate providing a recognition output signal in response to the predetermined potential from said threshold circuit or to an output signal from said multivibrator; and wherein said combination also includes a second threshold circuit providing a predetermined output potential in response to signals above a given output level from said signal integrating circuit, and a coincidence gate responsive to the first output signal from said second group of multivibrators and to the predetermined potential level from said second threshold circuit.

9. A mark and space symbol control system for controlling a message output function in a radio telegraphy system, the code employed to designate time separated mark and space symbols including a synchronizing pair of symbols having a time spacing which is greater than the regularly spaced remainder of the pulses, said control system operating to provide synchronizing pulses for each letter period only when an uninterrupted minimum sequence of pulses properly spaced has been detected, but also operating to provide output control signals for a predetermined minimum duration after a synchronizing pair has been missed, and to continue to provide output control signals until synchronization is re-established before the predetermined minimum time has elapsed, said control system comprising: first delay means including a sequence of one-shot multivibrators responsive to the input pulse trains, the first of said one-shot multivibrators including a signal inhibiting input, the sequence of multivibrators providing a delay greater than the regular spacing between pulses; a coincidence circuit coupled to the first and final ones of said one-shot multivibrators and providing an output signal when two successive pulses having the synchronizing pair spacing have been detected; a first individual one-shot multivibrator coupled to the output of said coincidence circuit and providing an output signal to the signal inhibiting input of said first delay means of sufficent duration to inhibit the operation of the first delay means until the next subsequent synchronizing pair is to be provided; a second individual one-shot multivibrator coupled to the output of the first individual one-shot multivibrator and providing an output signal in the duration of the next subsequent synchronizing pair; means coupled to both said first and second individual multivibrators for providing a control signal in response to the output of said second individual one-shot multivibrator, the control signal being terminated on the termination of the pulse of the second multivibrator when the first multivibrator is not in fired condition, thus indicating that a synchronizing pair has not been detected in the expected period after the last previous synchronizing pair, means responsive to said last named means and said first individual multivibrator for providing a timing signal when previous synchronizing pairs have been correctly detected; and means responsive to said control signal and including a third individual one-shot multivibrator fired by the termination of said control signal and a coupled mixer gate for providing an output control signal when either said control signal is provided or said third individual one-shot multivibrator is fired.

10. In combination with a system which uses pulse position modulated signals including negative pulses for spaces and positive pulses for marks, a recognition circuit for synchronizing signals having a unique spacing comprising: a threshold detector responsive to said signals; a first one-shot multivibrator responsive to the output of the threshold detector and having a signal suppression input; delay means including successive one-shot multivibrators coupled to the output of the first multivibrator and providing, with said first multivibrator, a delay dependent upon said unique spacing; and a coincidence circuit responsive to the output of the delay means and the first one-shot multivibrator; and providing an output indicative of the occurrence of the synchronizing signals, said coincidence circuit being coupled to the signal suppression input of said first multivibrator.

11. A circuit for providing an indication of the number of correctly spaced synchronizing signals occurring in a communication system which employs uniquely spaced synchronizing pairs occurring in like positions in each letter period, said circuit comprising: first delay means, including a first series of delay elements arranged to successively delay pulses applied thereto and a coincidence circuit coupled to two of said delay elements and providing an output in response to the unique spacing between pulses, second delay means providing an output indicative of the proper time of occurrence of the next subsequent synchronizing pair following an initial pulse; and means coupled to said second delay means for additively indicating, up to a given maximum, the number of successive and correctly related synchronizing pairs which are provided.

12. A circuit for providing an indication of the number of correctly spaced synchronizing signals occurring in a communication system which employs uniquely spaced synchronizing pairs occurring in like positions in each letter period, said circuit comprising: first delay means, including a first series of delay elements arranged to successively delay pulses applied thereto and a coincidence circuit coupled to two of said delay elements and providing an output in response to the unique spacing between pulses, a first of said delay elements including a suppression input; second delay means including a second series of delay elements, one of which is coupled to said suppression input and another of which provides an output indicative of the proper time of occurrence of the next subsequent synchronizing pair following an initial pulse; and means coupled to said second delay means for additively indicating, up to a given maximum, the number of successive and correctly related synchronizing pairs which are provided.

13. A circuit for use in a communication system that employs synchronizing pairs of pulses, said circuit comprising: delay means having a delay time corresponding to the interval between two pulses defining a synchronizing pair, a pulse coincidence circuit coupled to the opposite ends of said delay means to provide an output pulse upon the simultaneous occurrence of a pulse at each of said ends, and suppression means coupled to said delay means and to the output of said coincidence circuit, said suppression means being effective upon the occurrence of one of said output pulses to inactivate said delay means until the next synchronizing pair is to be provided.

References Cited in the file of this patent

UNITED STATES PATENTS

| | | |
|---|---|---|
| 2,577,827 | Tompkins | Dec. 11, 1951 |
| 2,795,775 | Faymoreau et al. | June 11, 1957 |
| 2,844,652 | Pinet | July 22, 1958 |

UNITED STATES PATENT OFFICE

CERTIFICATE OF CORRECTION

Patent No. 3,020,483 February 6, 1962

Ferril A. Losee

It is hereby certified that error appears in the above numbered patent requiring correction and that the said Letters Patent should read as corrected below.

Column 2, line 50, for "group" read -- grouped --; column 4, line 53, for "scond" read -- second --; column 7, line 20, for "cesastion" read -- cessation --; column 11, line 3, for "The" read -- This --.

Signed and sealed this 5th day of June 1962.

(SEAL)
Attest:

ERNEST W. SWIDER
Attesting Officer

DAVID L. LADD
Commissioner of Patents